April 11, 1967

M. P. AHO 3,313,288

HEATING MEANS FOR DEEP FAT FRYER

Filed Dec. 28, 1964

INVENTOR.
MARTIN PAUL AHO

BY William R. Piper

ATTORNEY

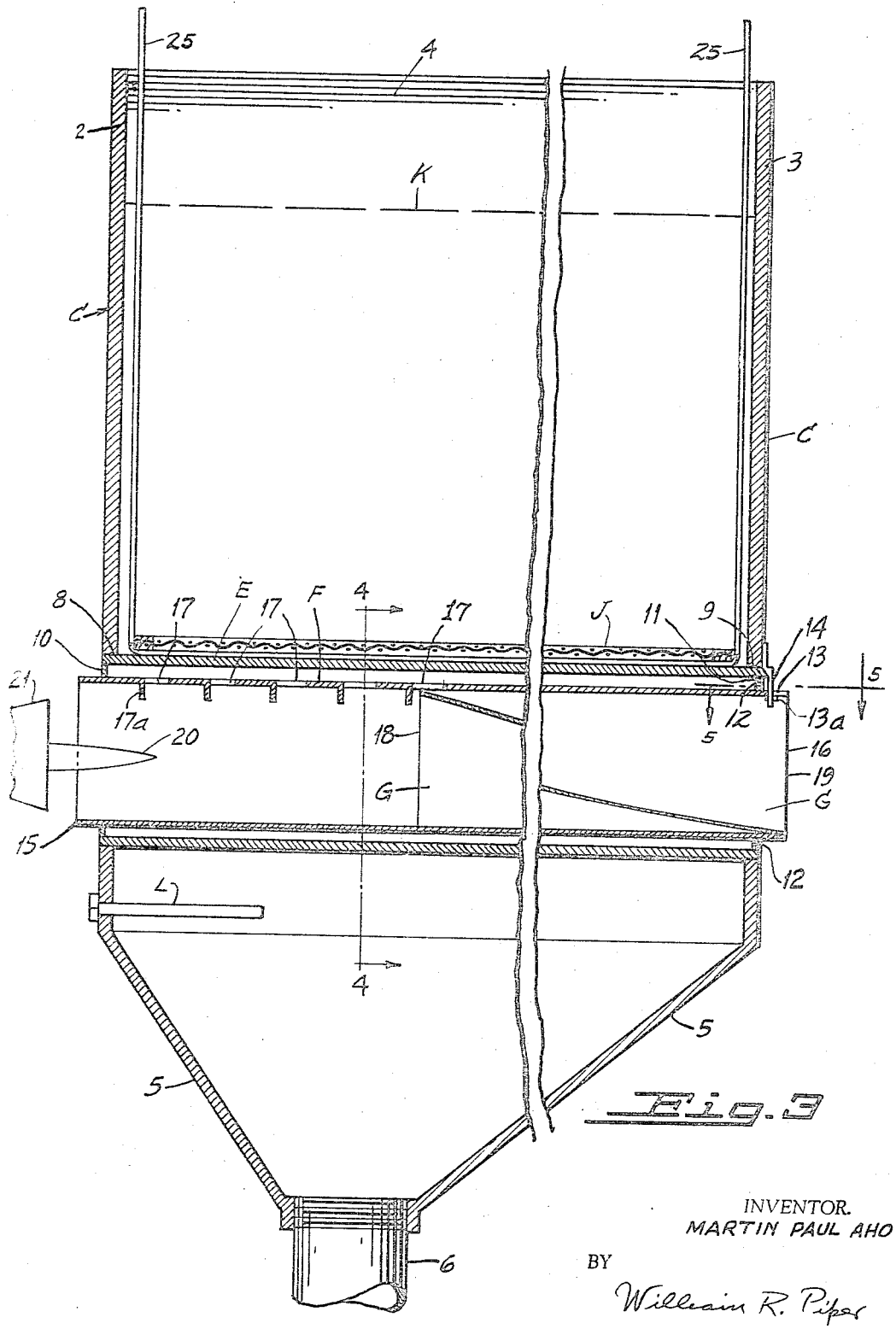

3,313,288
HEATING MEANS FOR DEEP FAT FRYER
Martin Paul Aho, 3048 Partridge Ave.,
Oakland, Calif. 94605
Filed Dec. 28, 1964, Ser. No. 421,485
2 Claims. (Cl. 126—391)

The present invention relates to improvements in a heating means for deep fat fryer, and it consists in the combination, construction and arrangement of parts as hereinafter described and claimed.

In the usual deep fat fryer a gas flame is directed against the bottom of the grease container. These deep fat fryers are equipped with modern thermostats and are set for a proper frying temperature of 375° F. Even though these deep fat fryers are thermostatically controlled, the grease frequently smokes which indicates burning, and after the grease is cooled, the grease shows a discoloration, which means that the grease is in a scorched condition. The burning of the grease causes it to break down and when this occurs, the donuts being cooked in the grease absorb the grease and such donuts will therefore have a greasy taste when eaten. Also the excessive heating of the grease will cause it to vaporize more rapidly and be lost. The above mentioned condition has been observed and it is my intention to eliminate it.

An object of my invention is to provide a heating means for a deep fat fryer that will prevent a gas flame from directly contacting with the wall of the grease container. Instead the gas flame or other type of heat will heat a tubular member that is concentrically mounted within a housing of a larger diameter. The air in the housing will be heated by the inner tubular member. The housing is immersed in the heated fat or grease in the container and will heat the grease to the desired temperature without overheating it.

A further object of my invention is to provide a device of the type described in which the tubular inner member or cartridge that receives the burning gases of combustion is removably mounted within the housing so that it can be removed for inspection and cleaning from time to time or a new inner member can be substituted for the one that can no longer be used. The tubular inner member has a helical partition or baffle mounted therein that extends substantially throughout the length of the member and has a width equal to the inner diameter of the member. The helical partition will cause the heated gases of combustion to rotate in the member as the gases move from the entrance to the exit end thereof. A more uniform distribution of heat throughout the length of the inner member is thus achieved and the housing that encloses the member will likewise be more uniformly heated from end to end.

The cylindrical space between the inner tubular member or cartridge and the cylindrical housing or tube that encloses the cartridge contains air and this cylindrical envelope of air prevents the gases of combustion within the cartridge from directly contacting with the inner surface of the tube. The cartridge wall has several rows of openings for permitting the passage of heat therethrough. Each opening has an inwardly extending lip placed on the portion of the opening disposed nearest to the front end of the cartridge. These lips deflect any flame that might strike them and prevent the flame from passing through the opening and directly contacting the inner surface of the cartridge-enclosing tube.

Other objects and advantages will appear as the specification continues. The novel features of the invention will be set forth in the appended claims.

DRAWINGS

For a better understanding of my invention, reference should be made to the accompanying drawings, forming part of this specification, in which:

FIGURE 3 is an enlarged sectional view taken along the line 3—3 of FIGURE 1.

DETAILED DESCRIPTION

Figure 1:
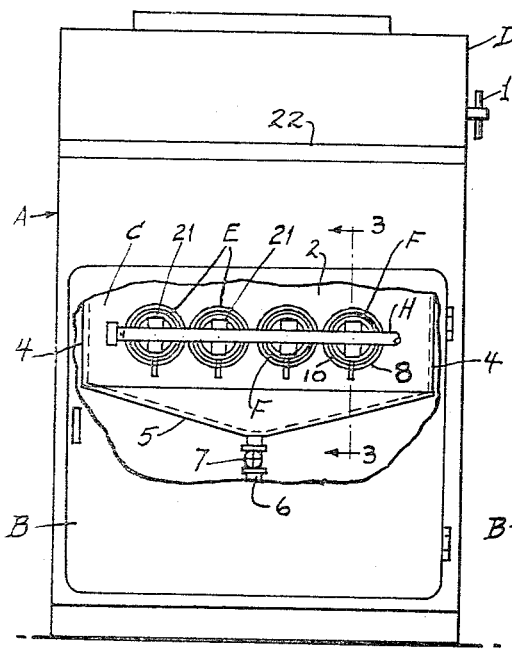
FIGURE 1 is a front elevation of a deep fryer cabinet with a portion broken away to show the deep fryer well.
Figure 2:
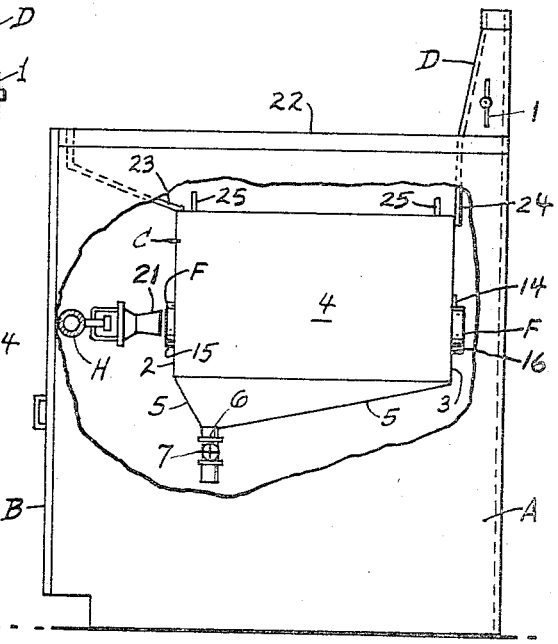
FIGURE 2 is a side elevation of FIGURE 1 and shows a portion broken away for illustrating the side view of the deep well fryer.

In carrying out my invention I make use of a deep fryer cabinet indicated generally at A in FIGURES 1 and 2. This cabinet has a front door B that will give access to a deep well fryer indicated generally at C. The cabinet A has a flue D and a damper which controls the flow of gases of combustion from the interior of the cabinet.

The deep well fryer C is supported within the cabinet A by any means desired, none being shown. The deep well fryer is shown in an enlarged section in FIGURE 3 and it will be noted that it has front and rear walls 2 and 3 and side walls 4. The bottom 5 of the deep well fryer C has downwardly inclined walls that lead to a drain pipe 6. A drain valve 7 normally closes the pipe 6 and holds the grease or other liquid in the deep well fryer.

I will now describe the means for heating the grease contained in the well. I provide a plurality of grease-heating tubes E that extend from the front wall 2 to the rear wall 3 of the deep well fryer. In FIGURE 1, I show four of these tubes E although I do not wish to be confined to any exact number. The front wall 2 of the deep well fryer C has openings 8 therein and these openings receive the front ends of the tubes E. The front tube ends may be welded or otherwise secured to the front wall 2. The rear wall 3 of the deep well fryer has openings 9 therein, see FIGURE 3, and these openings receive the rear ends of the tubes. The tubes may be welded to the rear wall 3 for making a liquid tight joint between the tube and the deep well fryer.

Figure 4:
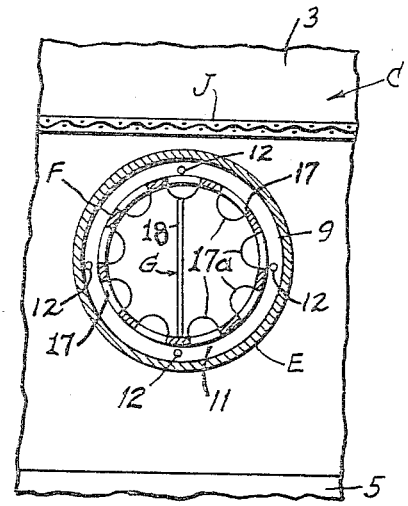
FIGURE 4 is a transverse section taken along the line 4—4 of FIGURE 3.

Referring to FIGURE 3, it will be seen that within each tube E, I removably mount a heating cartridge indicated generally at F. This cartridge is slightly longer in length than the tube E and it has a front spacing annular flange 10 whose outer rim will contact with the inner surface of the tube E. The cartridge also has a rear annular spacing flange 11 and the periphery of this flange will contact with the inner surface of the tube E. The rear flange 11 has four small openings 12 therein for the passage of gases of combustion therethrough. FIGURE 4 shows the tube E as receiving the cartridge F and the rear flange 11 spaces the cartridge from the inner wall of the tube E so that a cylindrical air space is disposed between the cartridge and the tube.

I provide simple means for removably securing the cartridge in the tube E. In FIGURE 3, I show the rear end of the cartridge as being provided with a bayonet slot 13. A securing and positioning pin 14 for the cartridge F is carried by the rear wall 3 and extends radially inwardly from the rim of the tube E. When the cartridge is inserted into the tube E, the operator grasps the front end 15 and slides the cartridge into the tube until the rear end 16 of the cartridge strikes the pin 14. The operator then rotates the cartridge in the tube E until the entrance to the bayonet slot 13 registers with the pin 14. When this takes place the cartridge can be moved longitudinally for causing the pin 14 to enter the bayonet slot and then when the pin reaches the right angle portion of the slot, shown at 13a in FIGURE 3, the operator can rotate the cartridge for causing the pin 14 to enter the angular portion of the bayonet slot and this will secure the cartridge in place in the tube. When the cartridge is thus secured, the front flange 10 will be received in the front end of the tube E and the rear flange 11 will be received in the rear end of the same tube. The axis of the cartridge will then be aligned with the axis of the tube.

The cartridge is provided with a plurality of rows of openings shown at 17 in FIGURE 4. These rows of openings are nine in number although I do not wish to be confined to any exact number of rows. Each opening 17 is formed by punching inwardly a portion 17a of the cartridge wall to form a flame deflecting lip that will be positioned at the front portion of the opening. For the sake of clarity I have only shown a part of one row of openings 17 in FIGURE 3 rather than a number of rows and I have shown the lips 17a extending inwardly from the front edges of these openings. The openings in each row preferably extend from a point near the front of the cartridge to a point near the rear of the cartridge.

I also provide a baffle G and mount this within the interior of the cartridge F. The front edge 18 of the baffle is preferably spaced inwardly from the front end 15 of the cartridge, a distance of about four inches although I do not wish to be confined to this exact measurement. The rear edge 19 of the baffle lies substantially flush with the rear end 16 of the cartridge F. The baffle G is shown in FIGURE 4 as extending diametrically across the interior of the cartridge. The baffle is in the shape of a helix that will take one complete revolution from the front end 18 of the baffle to the rear end 19. This will give a swirling motion to the gases of combustion as they flow through the cartridge and come into contact with the baffle. The purpose of spacing the front end 18 of the baffle from the front end of the cartridge is to give space for a burner flame 20, see FIGURE 3, to enter the interior of the cartridge without actually striking the front edge of the baffle. A portion of the gas nozzle 21 is illustrated in FIGURE 3 and the flame 20 issues from this nozzle.

In FIGURE 2, I show the gas nozzle 21 as being connected to a gas manifold H and in FIGURE 1, this gas manifold is illustrated as being long enough to feed gas to four of the gas nozzles 21. The gas nozzles in turn are centered with respect to the cartridges F that are inserted into the tubes E.

The deep well fryer C is shown in FIGURE 2 as being mounted within the cabinet A. This cabinet has an open top 22 and an inclined shelf 23 extends from the front wall 2 of the deep well fryer C up to the front of the open top of the cabinet. Also a rear partition 24 extends upwardly from the rear wall 3 of the deep well fryer C and the top of the partition connects with the lower edge of the front wall of the flue D. The partition directs all gases of combustion from the open rear ends of the cartridges F to the flue D where they will escape to the atmosphere.

FIGURE 3 shows a screen J that extends from the front wall 2 to the back wall 3 and also extends between the side walls 4. The screen J may be bounded by a frame and this frame and screen may be lifted by handles 25 that extend upwardly from the screen and project above the open top of the deep fryer well C. The food to be cooked is placed on the screen J and then the operator lowers the screen into the deep well fryer C by means of the handles 25 so that the food is entirely immersed in the hot grease indicated at K. If donuts are being fried, they may float in the heated grease but when the frying process is finished, these donuts will be lifted by the screen J as the operator moves the handles 25 upwardly for freeing the screen from the deep well fryer.

OPERATION

The principal novelty of my invention is the provision of the cylindrical layer of air that spaces the outer surface of the cartridge F from the inner surface of the tube E. The flame 20 from the gas nozzle 21 is directed inwardly into the front open end of the cartridge F. The inwardly extending lips 17a for the openings 17 in the nine rows of openings indicated in FIGURE 4, will deflect any flame that might strike the lips and prevent the flame from passing through the openings 17 and coming into direct contact with the inner surface of the tube E. Therefore the tube E can only be heated by conduction and the heat from the cylindrical wall of the cartridge F will have to pass through the cylindrical layer of air that lies between the outer surface of the cartridge and the inner surface of the tube E. The tube E will therefore not be unduly heated and the grease K that surrounds the tube will not be burned. I show four tubes E in FIGURE 1 and each tube encloses a cartridge F. One or more cartridges with their associate tubes could be used in the deep well fryer.

A thermostat is indicated diagrammatically at L in FIGURE 3 and it extends inwardly from the front wall 2. This thermostat is electrically connected to a valve, not shown, which controls the flow of gas into the manifold H and in this way the temperature of the grease K can be maintained at the proper point and at no time will the temperature go above 375° F. The gases of combustion will flow through the interior of each of the cartridges F and will escape from the rear end 16 of the cartridge and flow upwardly into the flue D. An adjustment of the damper 1 controls the flow of the gases of combustion through the flue.

The four small openings 12 in the rear flange 11 will permit a slow flow of air and any gases of combustion from the cylindrical space lying between the cartridge F and the tube E. This escape of gases of combustion through the small openings 12 is permitted because the openings 17 will not only permit heat to pass from the cartridge to the tube E but will also permit gases of combustion to enter the space between the cartridge and the tube to supplant the air and gases of combustion passing through the openings.

A more uniform heating of the cartridge F is effected by the spiral baffle G that extends lengthwise through a portion of the interior of the cartridge. The spiral baffle will cause the gases of combustion to rotate slowly as they flow through the cartridge interior and a slow rotation will aid in mixing the heated gases uniformly as they travel through the cartridge and they in turn will heat the wall of the cartridge F uniformly.

In case any cartridge has to be cleaned or exchanged for a new one, it is a simple matter to swing the gas nozzle 21 away from the front end of the cartridge and then disengage the cartridge from the bayonet slot and then move it longitudinally in a forward direction toward the front of the cabinet A. The cartridge can be removed through the open door B for the cabinet A. This is far easier to perform than it is to try and remove one of the tubes E from the deep well fryer.

Figure 5:
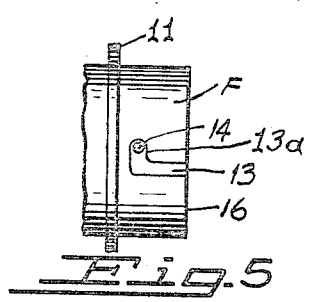
FIGURE 5 shows a portion of the rear end of the cartridge when looking in the direction of the arrows 5—5 of FIGURE 3. The bayonet slot in the cartridge is illustrated as receiving the locking and positioning pin for the cartridge.

The removed cartridge can be cleaned and reinserted or a new cartridge can be placed in the tube E. The operator slides the cartridge longitudinally into the tube E and the rear flange 11 will guide the rear end of the cartridge through the tube. When the rear end 16 of the cartridge strikes the stop and locking pin 14, the operator can rotate the cartridge until the entrance to the bayonet slot 13 registers with the pin and then the cartridge can be moved further into the tube until the pin 14 reaches the angle-shaped portion of the slot. The cartridge F is now rotated clockwise for moving the pin 14 into the inner end of the bayonet slot 13 as clearly shown in FIGURE 5. The pin 14 will not only lock the cartridge in place in the tube E, but it will also position the rear flange 11 of the cartridge at the rear wall 3 of the deep well fryer C and will position the front flange 10 adjacent to the front end of the tube E and also adjacent to the front wall 2 of the well C. The front end 15 of the cartridge F that projects beyond the front flange 10 constitutes an exposed portion that can be gripped by the operator for moving the cartridge into or out of the tube E and for rotating it into locked or unlocked position.

It is a simple matter for the operator to place the food to be fried on the screen J and then lower the screen into the well C. At the end of the cooking operation, the screen J can be removed from the well by means of the handle 25.

I claim:
1. In a device of the type described:
 (a) a deep well fryer adapted to hold grease for frying purposes;
 (b) a grease-heating tube extending through said well and being open at both ends;
 (c) a heating cartridge of smaller diameter than that of said tube and having two outwardly extending annular flanges adapted to contact with the inner cylindrical surface of said tube adjacent to the ends thereof for spacing the cartridge wall from the tube wall and providing an annular air space between the two walls that extends substantially throughout the length of said tube;
 (d) said cartridge wall having longitudinally extending rows of openings therein for permitting the hot gases of combustion to pass from the cartridge interior into said annular air space;
 (e) means for directing a gas flame into said cartridge interior from one end thereof; and
 (f) said cartridge wall having inwardly extending lips, one for each opening in the rows of openings, each lip being disposed adjacent to the portion of its associate opening that is positioned nearest to the entrance of the gas flame;
 (g) whereby said lips will deflect laterally within said cartridge the flow of gases of combustion striking the lips for preventing any portion of the gas flame from passing through said openings and striking said tube wall while permitting the heated gases to pass into said annular air space for heating it and said tube wall; the annular flange farthest removed from the gas flame having passages therein for the flow of gases and air therethrough.

2. The combination as set forth in claim 1: and in which
 (a) said cartridge being longer in length than that of said tube;
 (b) cartridge positioning and securing means for removably securing said cartridge to said tube so that the cartridge end disposed nearest to the gas flame will project beyond the adjacent tube end;
 (c) whereby when the gas flame is extinguished, the projecting end of said cartridge may be grasped for removing the cartridge from the tube.

References Cited by the Examiner

UNITED STATES PATENTS

| | | | |
|---|---|---|---|
| 1,689,551 | 10/1928 | Hammond | 126—360 X |
| 1,899,523 | 2/1933 | Ott et al. | 122—17 |
| 2,431,753 | 12/1947 | Holderle et al. | 126—391 |
| 2,478,732 | 8/1949 | Wilson et al. | 126—360 |
| 2,532,179 | 11/1950 | Miller | 122—17 |
| 2,541,171 | 2/1951 | McGarry | 158—4 |
| 2,601,000 | 6/1952 | Nerad | 158—4 |
| 2,606,549 | 8/1952 | Smith | 126—360 |

FOREIGN PATENTS 443,802  3/1936  Great Britain.

FREDERICK L. MATTESON, JR., *Primary Examiner.*
ROBERT A. DUA, *Examiner.*